United States Patent
Dong et al.

(10) Patent No.: US 11,442,541 B1
(45) Date of Patent: Sep. 13, 2022

(54) COLOR-BASED CALIBRATION FOR EYE-TRACKING

(71) Applicant: Meta Platforms Technologies, LLC, Menlo Park, CA (US)

(72) Inventors: Xu Dong, Menlo Park, CA (US); Thomas Scott Murdison, Kirkland, WA (US); Jixu Chen, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/097,376

(22) Filed: Nov. 13, 2020

(51) Int. Cl.
*G06F 3/01* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/0172* (2013.01); *G02B 2027/0138* (2013.01); *G02B 2027/0178* (2013.01)

(58) Field of Classification Search
CPC .......... G01B 11/14; G01B 11/22; G01J 3/506; G02B 27/01; G02B 27/017; G02B 2027/011; G02B 2027/0178; G06F 3/013; G06F 2203/011; G06T 15/20; G06T 19/006; G06T 2207/10012; G06T 2207/10052; G06T 3/20; G06T 3/40; G06T 3/60; G09G 3/003; G09G 3/006; G09G 5/02; G09G 2320/0233; G09G 2320/0242; G09G 2320/0276; G09G 2320/028; G09G 2320/029; G09G 2320/0626; G09G 2320/0666; G09G 2320/0673; G09G 2320/0693; G09G 2340/0464; G09G 2360/16; G09G 3/2092; G09G 3/3406; H04N 13/144; H04N 13/327; H04N 13/344; H04N 13/383; H04N 13/398; H04N 13/395
See application file for complete search history.

(56) References Cited

U.S. PATENT DOCUMENTS

| | | | |
|---|---|---|---|
| 8,824,779 B1 * | 9/2014 | Smyth | G06T 7/593 382/154 |
| 2017/0122725 A1 * | 5/2017 | Yeoh | G02B 27/017 |
| 2020/0126180 A1 * | 4/2020 | Gotsch | G06T 15/06 |

* cited by examiner

*Primary Examiner* — Nelson M Rosario
(74) *Attorney, Agent, or Firm* — Freestone Intellectual Property Law PLLC; Aaron J. Visbeek (57) ABSTRACT

A method for color-based calibration for eye-tracking includes presenting a calibration image to an eyebox area via a waveguide of a head mounted display (HMD). An estimated pupil center location of an eye is determined with an eye-tracking system. Next, user input is received in response to the calibration image. The user input includes an indication of a perceived color nonuniformity of the calibration image. The estimated pupil center location is then adjusted based on the user input.

20 Claims, 6 Drawing Sheets

COLOR-BASED CALIBRATION FOR EYE-TRACKING

BACKGROUND

A smart device is an electronic device that typically communicates with other devices or networks. In some situations, the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. Some smart devices, such as HMDs may perform eye-tracking which may enhance the user's viewing experience. Thus, some smart devices may incorporate an eye-tracking system that includes a camera for tracking movements of the user's eye.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to the color-based calibration of an eye-tracking system. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some aspects, a head mounted display (HMD) may include one or more waveguides for directing display light to an eyebox area for presenting images, video, text, or other graphics to a user. In some implementations, the waveguides may suffer from color nonuniformity. For example, one color of display light may be perceived as differing hues at different locations across a user's field of view. In addition, the perceived color nonuniformity differs with changes in pupil position. Thus, correcting for the color nonuniformity may include using an eye-tracking system to dynamically determine the current position of a user's pupil. Based on determined pupil position, the system may calculate a correction map and apply uniformity correction to the images being presented to the user. Thus, the accuracy of the color uniformity correction may be dependent, at least in part, on the accuracy of the eye-tracking system. However, eye geometry varies from user to user. The uniqueness of each user's eyes could manifest in a variety of ways. For example, several anatomical features, such as cornea radius, may vary from person to person. In addition, external factors may contribute to the uniqueness of a user's eyes, such as the use of contact lenses, previous eye surgery, and so on. Even still, an eye's sensitivity to color nonuniformity may vary from user to user. The specific properties of each person's eye, governed by aforementioned factors, give each user a unique optical transfer function that is difficult to account for with conventional image-based eye-tracking systems that have no prior knowledge about the specific user's eye.

Accordingly, aspects of the present disclosure provide a system that utilizes user feedback regarding color uniformity correction to generate a user-specific calibration for increasing the accuracy of the eye-tracking system. For example, the system may present an image to a user that includes a target. While the user gazes at the target, user input is received regarding the user's perceived color nonuniformity. Based on the user input, the system can extrapolate a more accurate pupil location, which may be saved in a user-specific profile for calibrating future eye-tracking operations and/or for increasing the accuracy of the color uniformity correction, itself. These and other aspects of the present disclosure, will be described in more detail below.

Figure 1:
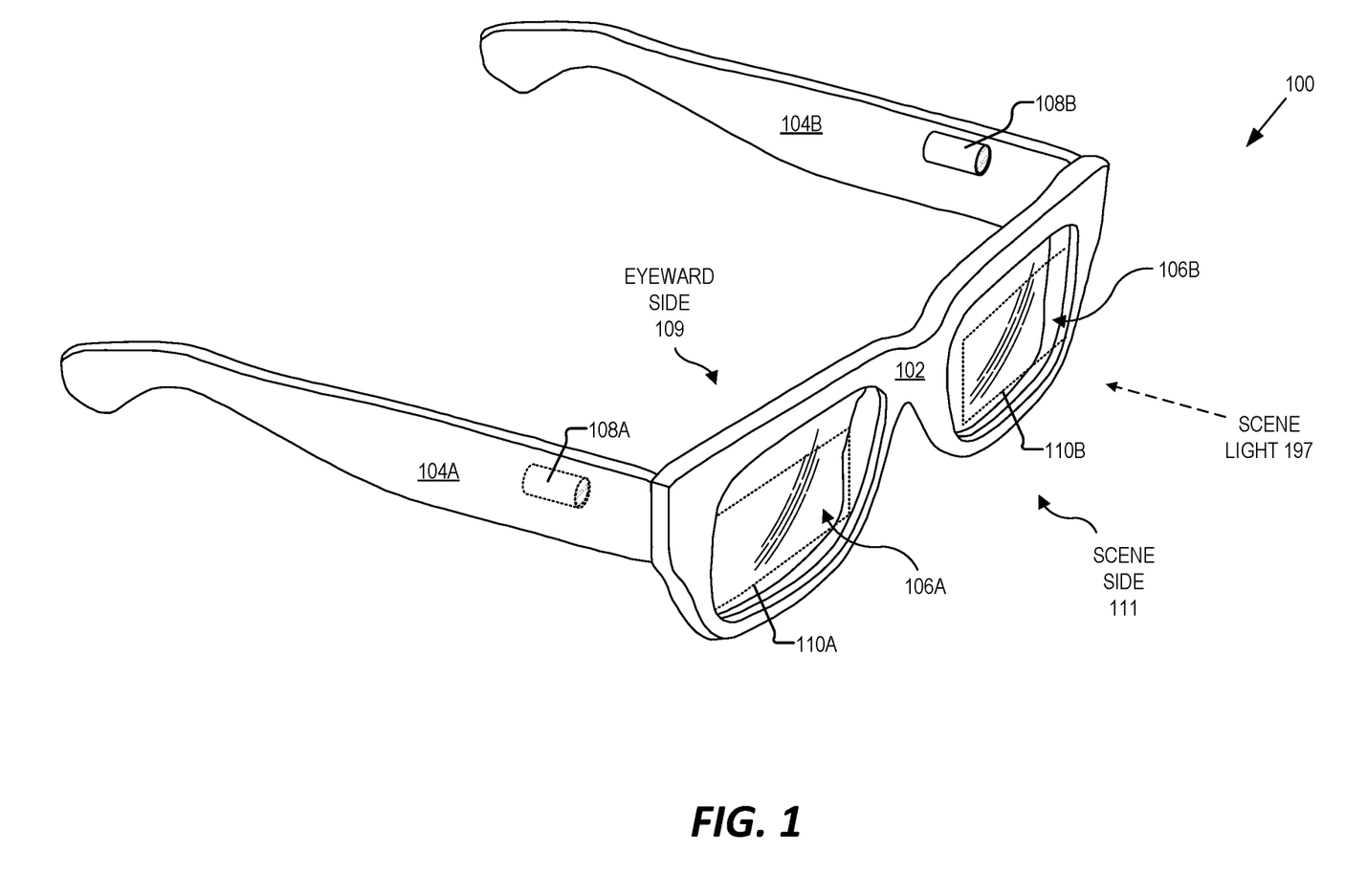
FIG. 1 illustrates a head mounted display (HMD), in accordance with aspects of the present disclosure.

FIG. 1 illustrates an example HMD 100, in accordance with aspects of the present disclosure. The illustrated example of HMD 100 is shown as including a frame 102, temple arms 104A and 104B, and near-eye optical elements 106A and 106B. Eye-tracking cameras 108A and 108B are shown as coupled to temple arms 104A and 104B, respectively. In some aspects, eye-tracking cameras 108A and/or 108B may receive non-visible light (e.g. near-infrared light) from an optical combiner included in near-eye optical elements 106A/B. In other aspects, eye-tracking cameras 108A and/or 108B may be positioned to image the eye directly. Near-eye optical elements 106A and 106B may include a display layer including one or more waveguides 110A/110B that are configured to direct virtual images to an eyebox area (e.g., to the eye of a user of HMD 100). For example, the display layer of near-eye optical element 106A may include waveguide 110A to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light. "Near-eye optical elements" may be defined as including an optical element that is configured to be placed within 35 mm of an eye of a user while a near-eye optical device such as an HMD is being utilized, in some aspects.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 106A and 106B that are configured to be mounted to the frame 102. In some examples, near-eye optical elements 106A and 106B may appear transparent to the user to facilitate augmented reality or mixed reality such that the user can view visible scene light 197 from the environment while also receiving image light directed to their eye(s) by way of the display layer. In further examples, some or all of near-eye optical elements 106A and 106B may be incorporated into a virtual reality headset where the transparent nature of the near-eye optical elements 106A and 106B allows the user to view an electronic display (e.g., a liquid crystal display (LCD), an organic light emitting diode (OLED) display, a micro-LED display, etc.) incorporated in the virtual reality headset. In some aspects, near-eye optical elements 106A and 106B include an optically transparent layer having a thickness and/or curvature that corresponds to the specifications of a user. In other words, the optically transparent layer may be a prescription lens. However, in other examples, the optically transparent layer may be a non-prescription lens.

In some examples, eye-tracking cameras 108A/B include an infrared camera configured to image the eye of the user based on the received infrared light. In some implementations, near-eye optical elements 106A/B include a combiner layer configured to direct infrared light to the cameras to facilitate imaging the eye of a user for eye-tracking purposes.

Figure 2:
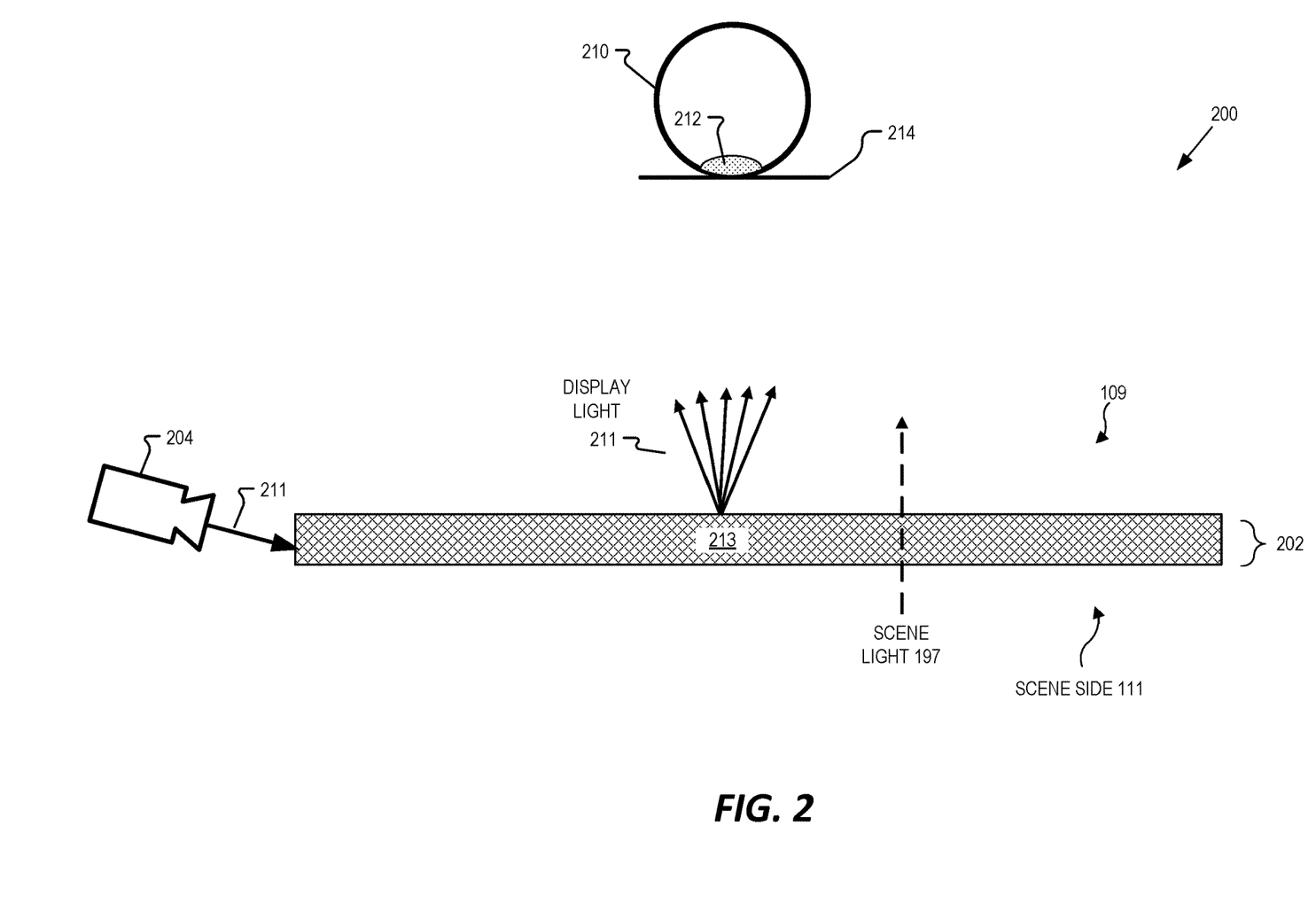
FIG. 2 illustrate a near-eye display system, in accordance with aspects of the present disclosure.

FIG. 2 illustrates a functional diagram of a near-eye display system 200 that includes a waveguide 202 of a near-eye optical element. Waveguide 202 is one possible implementation of waveguide 110A and/or waveguide 110B of FIG. 1. In some aspects, waveguide 202 includes one or more diffractive structures. Near-eye display system 200 also includes an image generator 204 configured to generate display light 211. Image generator 204 may be implemented as one or more image projectors. For example, image generator 204 may include one or more LCOS projectors.

In the illustrated example of near-eye display system 200, image generator 204 generates display light 211 that is directed to the waveguide 202. The display light 211 then propagates through at least a portion of waveguide 202 to an outcoupling element 213, which then directs the display light 211 to an eyebox area 214.

Figure 3A:
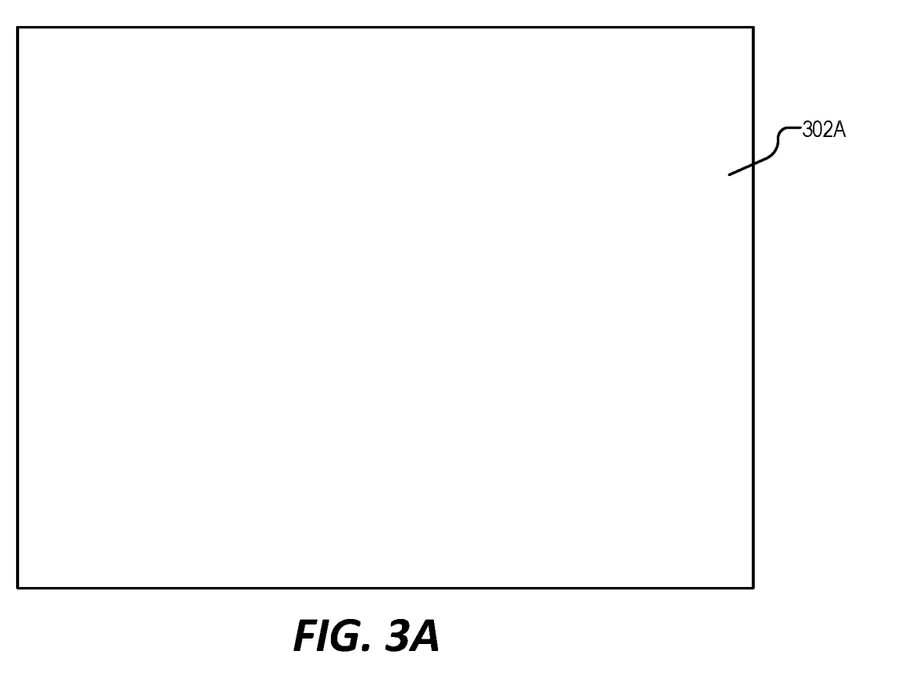
FIG. 3A illustrates an image generated for presentation to an eyebox area via a waveguide of a near-eye optical element, in accordance with aspects of the present disclosure.
Figure 3B:
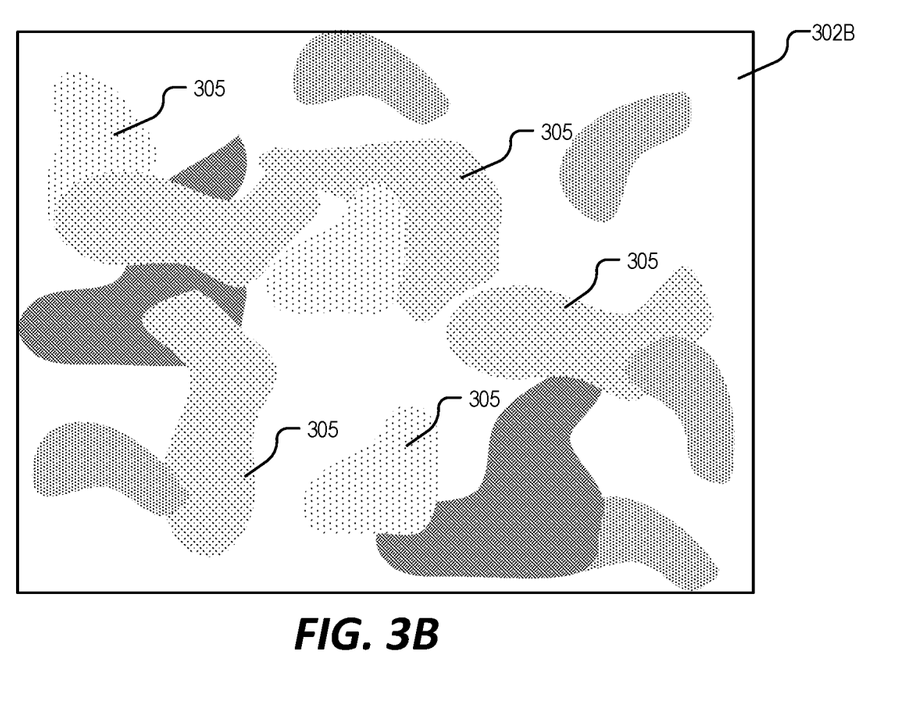
FIG. 3B illustrates the image of FIG. 3A that includes color variances as viewed by a user of the near-eye optical element.

As mentioned above, a waveguide, such as waveguide 202 may suffer from color nonuniformity. That is, one color of display light 211 may be perceived as differing hues at different locations across a user's field of view. By way of example, FIG. 3A illustrates an image 302A that is generated by the image generator 204 for presentation to the eyebox area 214 via waveguide 202. In the particular example, image 302A is a single solid color, such as white. However, due to the color non-uniformity of the waveguide 202 and due to the particular characteristics and position of the user's eye 210, the image 302A is not perceived as a single solid color image. Instead, FIG. 3B illustrates a perceived image 302B, as viewed by the eye 210. As shown in FIG. 3B, the perceived image 302B includes one or more color variances 305 at various locations within the field of view. The color variances 305 of FIG. 3B represent variations in hue, such as red, green, blue, or combinations thereof. The color variances 305 are present in the perceived image 302B, despite the image 302A being generated by the image generator 205 as a single solid color image.

Accordingly, aspects of the present disclosure may include a system that provides for dynamically correcting color nonuniformities of a waveguide based on a current position of the user's eye (determined by an eye-tracking system). In addition, aspects of the present disclosure may also perform a calibration procedure of the eye-tracking system utilizing user feedback regarding the user's perceived color nonuniformity. In some examples, the calibration procedure is a process that minimizes the residuals between the estimated pupil center location (e.g., pupil 212 of eye 210 of FIG. 2) provided by the eye tracking system and the pupil center location derived from user feedback regarding the perceived color nonuniformity.

Figure 4:
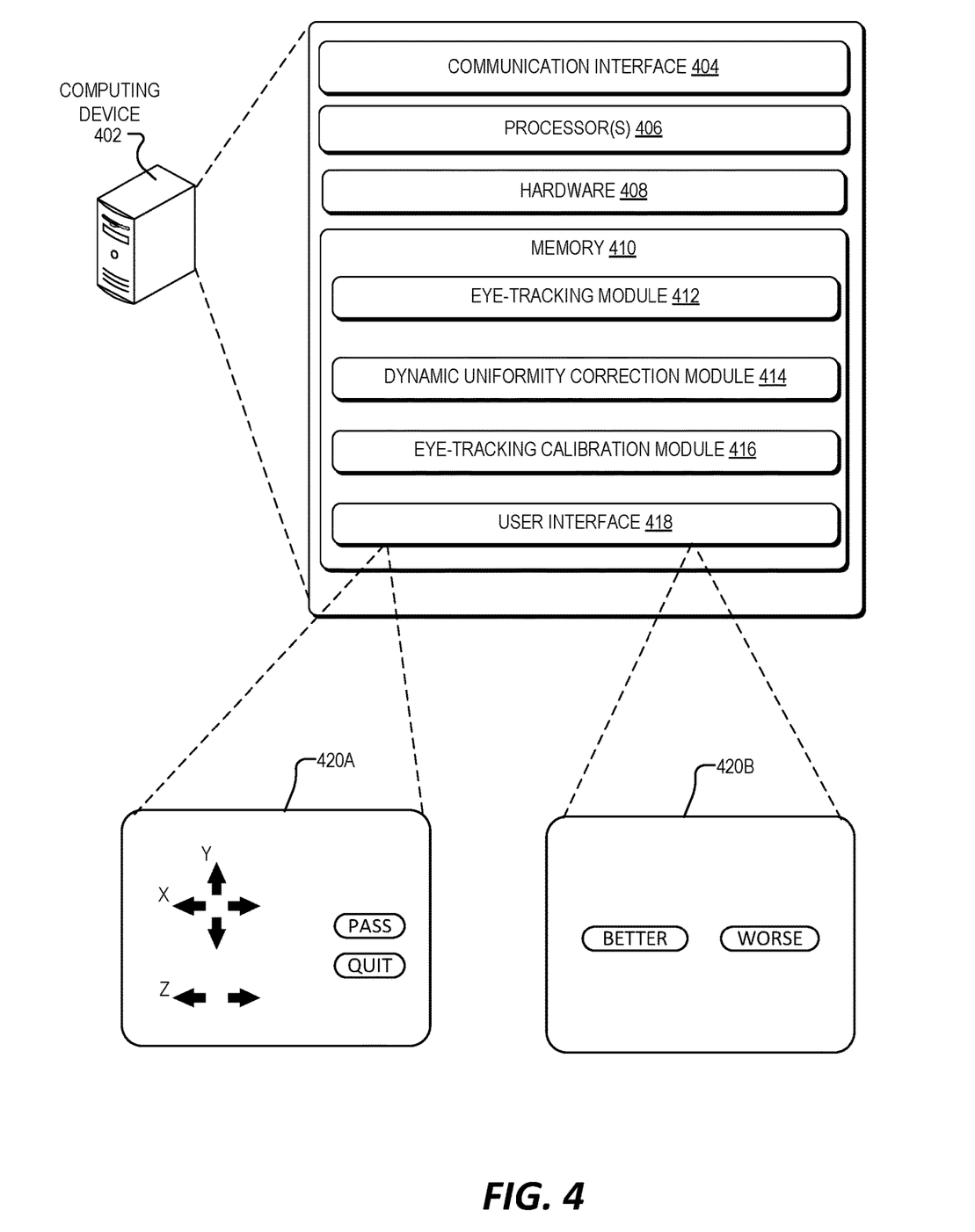
FIG. 4 illustrates an example computing device for the color-based calibration of an eye-tracking system, in accordance with aspects of the present disclosure.

FIG. 4 illustrates an example computing device 402 for the color-based calibration of an eye-tracking system, in accordance with aspects of the present disclosure. The illustrated example of computing device 402 is shown as including a communication interface 404, one or more processors 406, hardware 408, and a memory 410. In one example, one or more of the components illustrated in FIG. 4 may be incorporated into the frame 102 and/or temple arms 104A/104B of the HMD 100 of FIG. 1. In other examples, one or more of the components illustrated in FIG. 6 may be incorporated into a remote computing device that is communicatively coupled to the HMD 100 for performing one or more aspects of the color-based calibration.

The communication interface 404 may include wireless and/or wired communication components that enable the computing device 402 to transmit data to and receive data from other networked devices. The hardware 408 may include additional hardware interface, data communication, or data storage hardware. For example, the hardware interfaces may include a data output device (e.g., electronic display, audio speakers), and one or more data input devices.

The memory 410 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device.

The processors 406 and the memory 410 of the computing device 402 may implement an eye-tracking module 412, a dynamic uniformity correction module 414, an eye-tracking calibration module 416, and a user interface 418. The eye-tracking module 412, dynamic uniformity correction module 414, eye-tracking calibration module 416, and user interface 418 may include routines, program instructions, objects, and/or data structures that perform particular tasks or implement particular abstract data types. The memory 410 may also include a data store (not shown) that is used by the eye-tracking module 412, the dynamic uniformity correction module 414, and/or the eye-tracking calibration module 416.

The eye-tracking module 412 may be configured to determine eye-tracking information (e.g., location, orientation, gaze angle, etc. of the eye). In some aspects, the eye-tracking module 412 may determine the eye-tracking information based on one or more images captured by the eye-tracking camera (e.g., eye-tracking camera 108A) of the HMD. For example, the eye-tracking module 412 may be configured to receive an image captured by the eye-tracking camera and process the image to determine the eye tracking information, such as the pupil center location.

The dynamic uniformity correction module 414 may be configured to correct for color nonuniformity of a waveguide, such as waveguide 202 of FIG. 2. In a static case, where the eye position is fixed and not moving, a correction map $T=W^{-1}$ may be calculated that reverses the color nonuniformity caused by the waveguide. However, as mentioned above, with use in an HMD, the user's eye position is not fixed, and thus the color nonuniformity of the waveguide varies with the user's pupil center location. Accordingly, the dynamic uniformity correction module 414 may be configured to receive the estimated pupil center location from the eye-tracking module 412 and to dynamically calculate a correction map that is specific to the estimated pupil center location. The dynamic uniformity correction module 414 may then apply uniformity correction to the image being presented on the waveguide 202 to eliminate, or at least reduce, the presence of the color variances (e.g., see color variances 305 of FIG. 3B).

The eye-tracking calibration module 416 may be configured to perform a color-based calibration of the eye-tracking system. In some implementations, the eye-tracking calibration module 416 may be configured to implement a user interface 418 for receiving user input. The user interface 418 may be configured to provide any suitable interface systems, such as one or more user input devices (e.g., buttons) and/or an electronic display. FIG. 4 illustrates one possible implementation of a user interface 420A that includes 3-dimensional control user interface elements, X, Y, and Z, as well as additional "PASS" and "QUIT" user interface elements. FIG. 4 also illustrates an alternative user interface 420B, that provides simplified user interface elements "BETTER" and "WORSE". User interfaces 420A and/or 420B may be utilized by the eye-tracking calibration module 416 to receive user input regarding a user's perceived color nonuniformity of an image being presented via the waveguide.

In some implementations, the eye-tracking calibration module 416 is configured to perform the color-based calibration as part of a setup process of an HMD, such as HMD 100 of FIG. 1. In some examples, the color-based calibration process is performed for each new user of the HMD 100. The operation of eye-tracking calibration module 416 will now be discussed with reference to the calibration image 502A of FIG. 5A, the perceived calibration image 502B of FIG. 5B, and the color-based calibration process 600 of FIG. 6.

Figure 6:
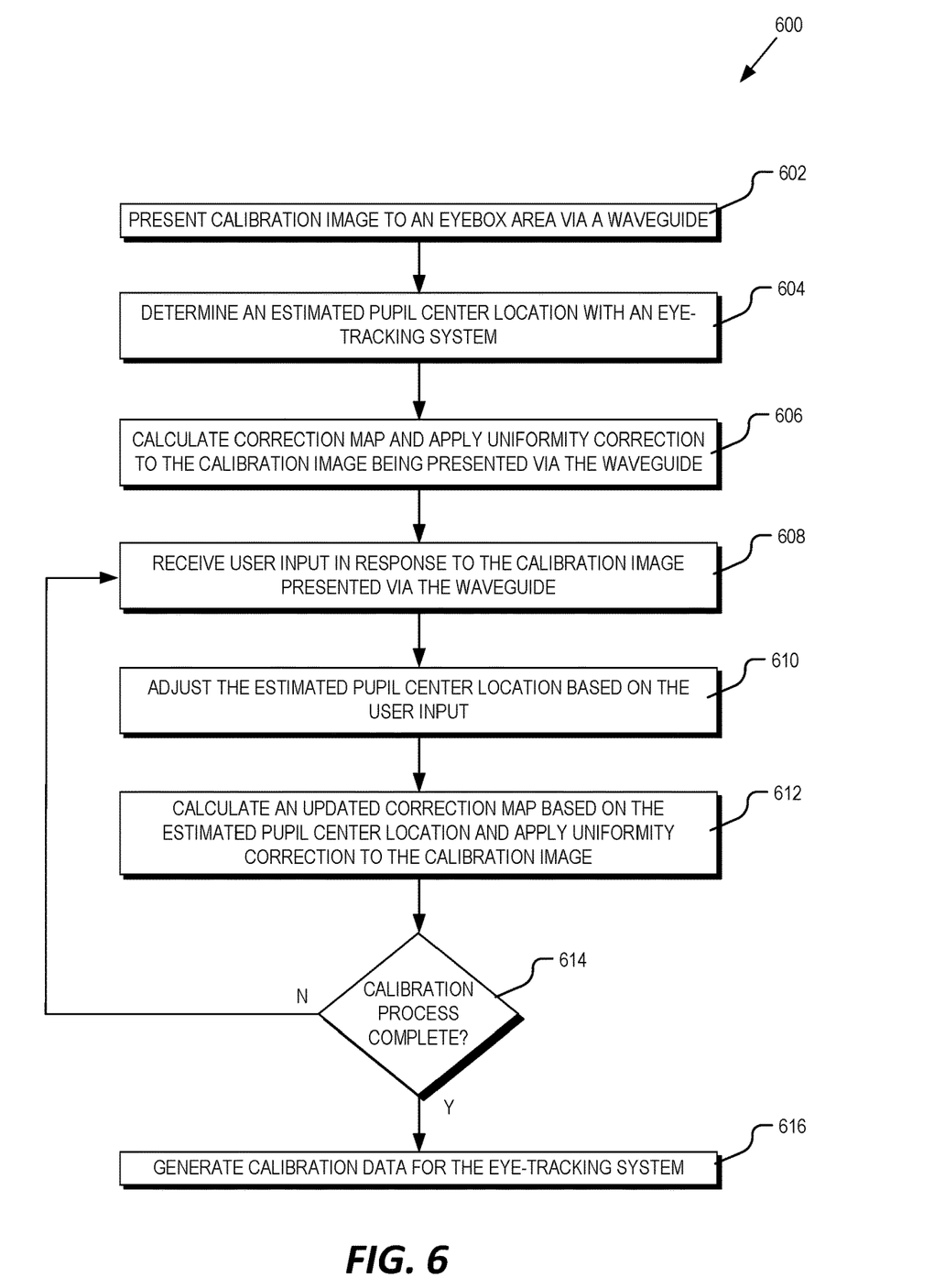
FIG. 6 is a flow chart illustrating an example process of color-based calibration of an eye-tracking system, in accordance with aspects of the present disclosure.

In particular, the color-based calibration process 600 of FIG. 6 is one possible process performed by one or more of the components of computing device 402, including the eye-tracking module 412, the dynamic uniformity correction module 414, the eye-tracking calibration module 416, and the user interface 418.

Figure 5A:
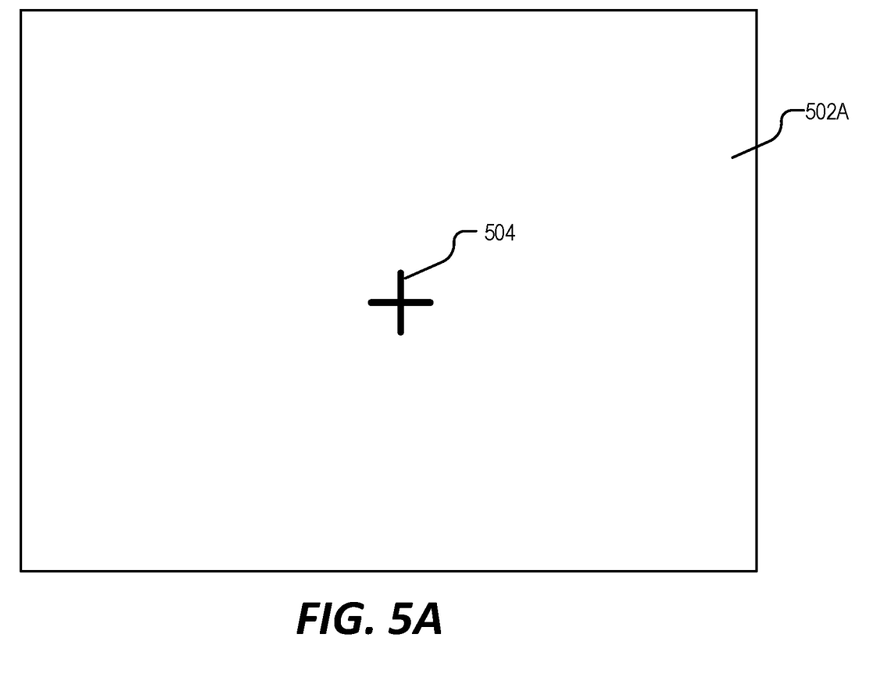
FIG. 5A illustrates a calibration image generated for the color-based calibration of an eye-tracking system, in accordance with aspects of the present disclosure.
Figure 5B:
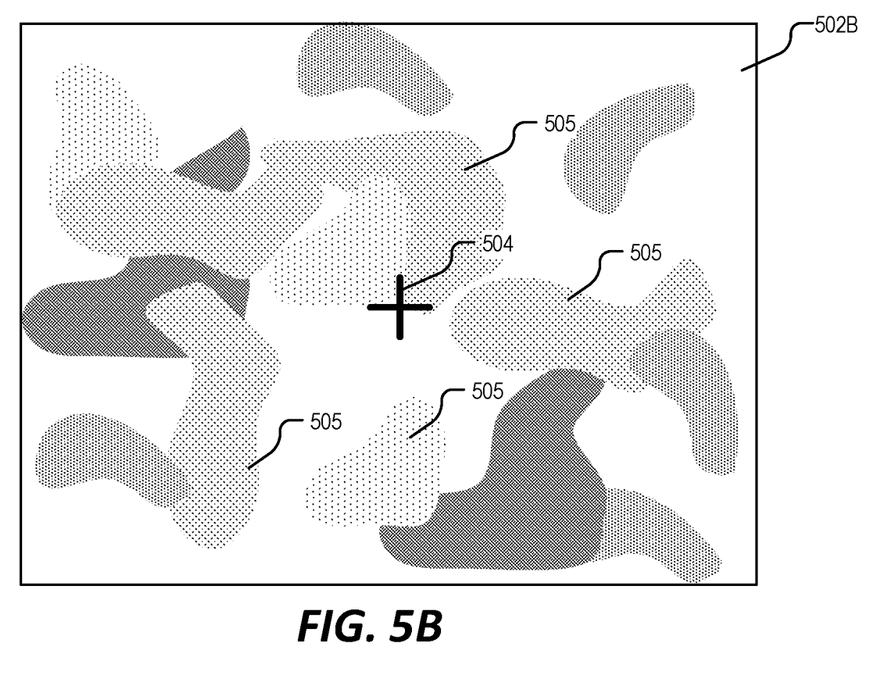
FIG. 5B illustrates the calibration image of FIG. 5A that includes color variances as viewed by a user, in accordance with aspects of the present disclosure.

In a process block 602, the eye-tracking calibration module 416 generates a calibration image 502A. As shown in FIG. 5A, the calibration image 502A may include a virtual target 504 that is positioned at a known location within the calibration image 502A. In some implementations, the calibration image 502A is generated as a solid, single color image, such as white. In another implementation, the calibration image 502A may be generated to include a variety of objects or features, of varying colors at various locations within the user's field of view. The image generator (e.g., image generator 204 of FIG. 2) then directs display light through the waveguide for presenting the calibration image 502A to an eyebox area (e.g., eyebox area 214). In some examples, the user interface 418 may display directions for the user to look or focus on the target 504, while the calibration image 502A is being presented. FIG. 5B illustrates the perceived calibration image 502B that includes color variances 505 as viewed by a user.

Returning to FIG. 6, process block 604 includes the eye-tracking module 412 determining an estimated pupil center location (e.g., pupil center location of pupil 212 of FIG. 2), while the user is fixated on target 504. As discussed above, the eye-tracking module 412 may determine the estimated pupil center location based on one or more images captured via the eye-tracking camera (e.g., eye-tracking camera 108A of FIG. 1).

Next, in a process block 606, the dynamic uniformity correction module 414 calculates a correction map based on the estimated pupil center location. The dynamic uniformity correction module 414 may then apply uniformity correction to the calibration image 502A which is being presented via the waveguide. However, due to the tolerances of the eye-tracking system and/or due to the anatomical or external factors of the user's eye, one or more of the color variances 505 may remain in the perceived calibration image 502B, even after the uniformity correction is applied to the calibration image. Thus, in process block 608, the eye-tracking calibration module 416 may receive user input via user interface 418. The received user input may include an indication of a perceived color nonuniformity of the calibration image. For example, if implemented as user interface 420A, the user input may include actual adjustments to be made to the estimated pupil center location. That is, the user may adjust the estimated pupil center location by way of the X, Y, and/or Z user interface elements to make incremental changes to the estimated pupil center location if the perceived color nonuniformity is unacceptable. Alternatively, if implemented as user interface 420B, the user input may simply include an indication from the user whether the color uniformity of the currently-displayed calibration image is better or worse than a previously-displayed calibration image.

Process 600 then continues to process block 610, where the eye-tracking calibration module 416 adjusts the estimated pupil center location based on the user feedback (e.g., adjust the estimated pupil center location based on the incremental changes provided by way of user interface 420A or adjust the estimated pupil center location based on the users indication provided in user interface 420B that the color uniformity is better or worse).

In a process block 612, the dynamic uniformity correction module 414 then calculates an updated correction map based on the (now adjusted) estimated pupil center location. The dynamic uniformity correction module 414 also applies uniformity correction to the calibration image 502A based on the updated correction map.

In a decision block 614, the eye-tracking calibration module 416 then determines whether the calibration process is complete. In some examples, process blocks 608-612 may be repeated (e.g., receive user input, adjust estimated pupil center location, and calculate updated correction map) until user input is received that indicates that the perceived color uniformity is acceptable by the user. In some examples, such an indication may be provided by the user interface element "PASS" or "QUIT" of user interface 420A. In another example, the indication that the perceived color uniformity is acceptable may be inferred based on the last of a series of user input's received via user interface 420B that indicate a perceived color uniformity was better.

In some examples, once the calibration process is complete, indicating that the current level of color uniformity is acceptable to the user, the eye-tracking calibration module 416 may generate an entry that is stored in memory (e.g., memory 410 of FIG. 4). The entry may include the estimated pupil center location (as adjusted by the eye-tracking calibration module 416) along with one or more of the images of the eye captured by the eye-tracking module 412 while the user's eye was fixated on the target 504 of the corresponding calibration image. In some examples, the process 600 may be repeated with the target 504 located at a variety of locations within the calibration image 502A. That is, each iteration of process 600 may include generating an entry of an estimated pupil center location and images captured by the eye-tracking camera corresponding to a particular location of the target 504 generated with the calibration image 502A. In some examples, the displayed targets 504 are distributed uniformly across the calibration image 502A to ensure that the entries of estimated pupil center locations are representative of a wide range of possible eye movements.

In a process block 616, the eye-tracking calibration module 416 generates calibration data for the eye-tracking system (e.g., eye-tracking module 412). The calibration data may include the one or more entries of estimated pupil center locations and their corresponding images captured by the eye-tracking camera. In some examples, the calibration data is saved in a user-specific profile for calibrating future eye-tracking operations performed by eye-tracking module 412. In another example, the calibration data may be saved in a user-specific profile for increasing the accuracy of subsequent color uniformity corrections performed by the dynamic uniformity correction module 414.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method, comprising:
presenting a calibration image to an eyebox area via a waveguide of a head mounted display (HMD);
determining an estimated pupil center location of an eye with an eye-tracking system;
receiving user input, which is provided via user control of at least one button on a user interface, in response to the calibration image, wherein the user input includes an indication of a perceived color nonuniformity of the calibration image; and
adjusting the estimated pupil center location based on the user input.

2. The computer-implemented method of claim 1, wherein the calibration image comprises a solid, single-color image.

3. The computer-implemented method of claim 1, wherein the calibration image comprises a target, and wherein determining the estimated pupil center location comprises determining the estimated pupil center location while the eye is fixated on the target.

4. The computer-implemented method of claim 1, wherein the calibration image comprises a target, and wherein the user input includes the indication of a perceived color nonuniformity while the eye is fixated on the target.

5. The computer-implemented method of claim 1, wherein the calibration image comprises a target, and wherein the method further comprises:
repeating the presenting, the determining, the receiving, and adjusting for a plurality of calibration images, where each calibration image of the plurality includes a respective target generated within the calibration image at a different location.

6. The computer-implemented method of claim 1, wherein the user input includes an incremental change to the estimated pupil center location using the at least one button on the user interface, and wherein the at least one button includes a plurality of 3-dimensional control user interface elements that are user controllable to adjust the estimated pupil location along X, Y, and Z directions.

7. The computer-implemented method of claim 1, wherein the user input includes an indication of whether the perceived color nonuniformity of the calibration image is better or worse than a previously displayed calibration image, and wherein the at least one button includes a first button that is user controllable to indicate that the perceived color nonuniformity is better and a second button that is user controllable to indicate that the perceived color nonuniformity is worse.

8. The computer-implemented method of claim 1, further comprising:
    calculating a correction map based on the estimated pupil center location; and
    applying uniformity correction to the calibration image to correct the color nonuniformity.

9. The computer-implemented method of claim 1, further comprising:
    generating calibration data for calibration of the eye-tracking system based on the adjusting of the estimated pupil center location,
    wherein the calibration data comprises one or more entries that include an estimated pupil center location and at least one image of the eye captured by the eye-tracking system.

10. The computer-implemented method of claim 1, wherein generating calibration data comprises saving the calibration data to a user-specific profile.

11. A computing device for a head mounted display (HMD), the computing device comprising:
    at least one processor; and
    at least one memory coupled to the at least one processor, the at least one memory having instructions stored therein, which when executed by the at least one processor, direct the computing device to:
        present a calibration image to an eyebox area via a waveguide of the HMD;
        determine an estimated pupil center location of an eye with an eye-tracking system;
        receive user input in response to the calibration image, wherein the user input is received from a button of a user interface, and wherein the user input includes an indication of a perceived color nonuniformity of the calibration image; and
        adjust the estimated pupil center location based on the user input received from the button of the user interface.

12. The computing device of claim 11, wherein the user input includes the indication of a perceived color nonuniformity while the eye is fixated on a target included in the calibration image.

13. The computing device of claim 12, wherein the at least one memory further comprises instructions to direct the computing device to:
    repeat the instructions to present, determine, receive, and adjust for a plurality of calibration images, where each calibration image of the plurality includes a respective target generated within the calibration image at a different location.

14. The computing device of claim 11, wherein the at least one memory further comprises instructions to direct the computing device to:
    calculate a correction map based on the estimated pupil center location; and
    apply uniformity correction to the calibration image to correct the color nonuniformity.

15. The computing device of claim 11, wherein the at least one memory further comprises instructions to direct the computing device to:
    generate calibration data for calibration of the eye-tracking system based on the instructions to adjust the estimated pupil center location.

16. The computing device of claim 15, wherein the calibration data comprises one or more entries that include an estimated pupil center location and at least one image of the eye captured by the eye-tracking system.

17. The computing device of claim 11, wherein the at least one button includes:
    a plurality of 3-dimensional control user interface elements that are user controllable to adjust the estimated pupil location along X, Y, and Z directions, or
    a first button that is user controllable to indicate that the perceived color nonuniformity of the calibration image is better than a previously displayed calibration image, and a second button that is user controllable to indicate that the perceived color nonuniformity of the calibration image is worse than the previously displayed calibration image.

18. A head mounted display (HMD), comprising:
    an eye-tracking camera configured to capture an image of an eye of a user of the HMD;
    a waveguide;
    at least one processor coupled to the eye-tracking camera and to the waveguide; and
    at least one memory coupled to the at least one processor, the at least one memory having instructions stored therein, which when executed by the at least one processor, direct the at least one processor to:
        present a calibration image to an eyebox area via the waveguide;
        determine an estimated pupil center location of an eye based on the image captured by the eye-tracking camera;
        receive user input in response to the calibration image, wherein the user input is received from at least one button of a user interface, and wherein the user input includes an indication of a perceived color nonuniformity of the calibration image; and
        adjust the estimated pupil center location based on the user input received from the at least one button of the user interface.

19. The HMD of claim 18, wherein the at least one memory further comprises instructions to direct the at least one processor to:
    generate calibration data for calibration of an eye-tracking system based on the instructions to adjust the estimated pupil center location.

20. The HMD of claim 18, wherein the at least one button includes:
    a plurality of 3-dimensional control user interface elements that are user controllable to adjust the estimated pupil location along X, Y, and Z directions, or
    a first button that is user controllable to indicate that the perceived color nonuniformity of the calibration image is better than a previously displayed calibration image, and a second button that is user controllable to indicate that the perceived color nonuniformity of the calibration image is worse than the previously displayed calibration image.

* * * * *